J. L. HULBERT.
TEAT CUP FOR MILKING MACHINES.
APPLICATION FILED JUNE 1, 1912.
1,089,838.
Patented Mar. 10, 1914.
3 SHEETS—SHEET 1.
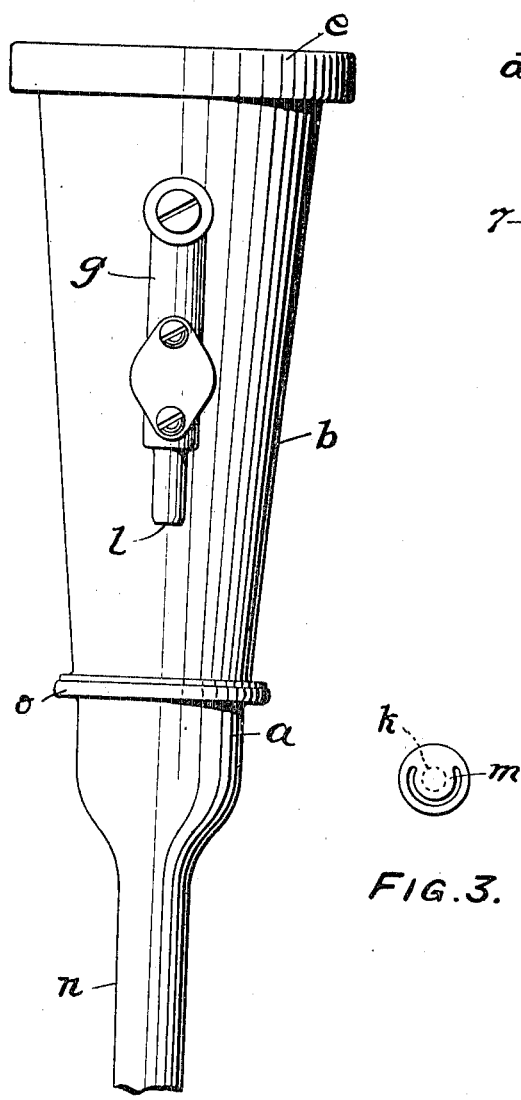
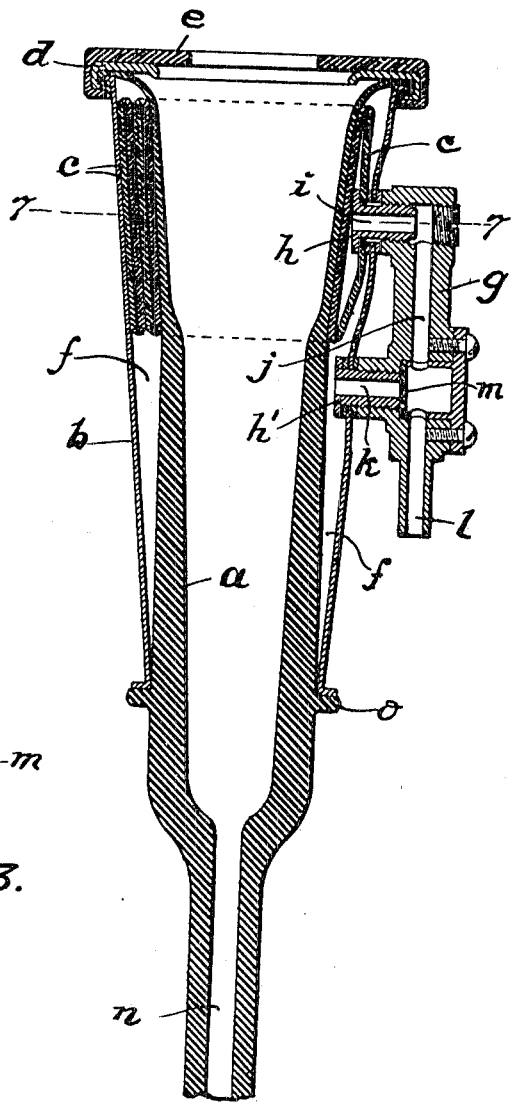

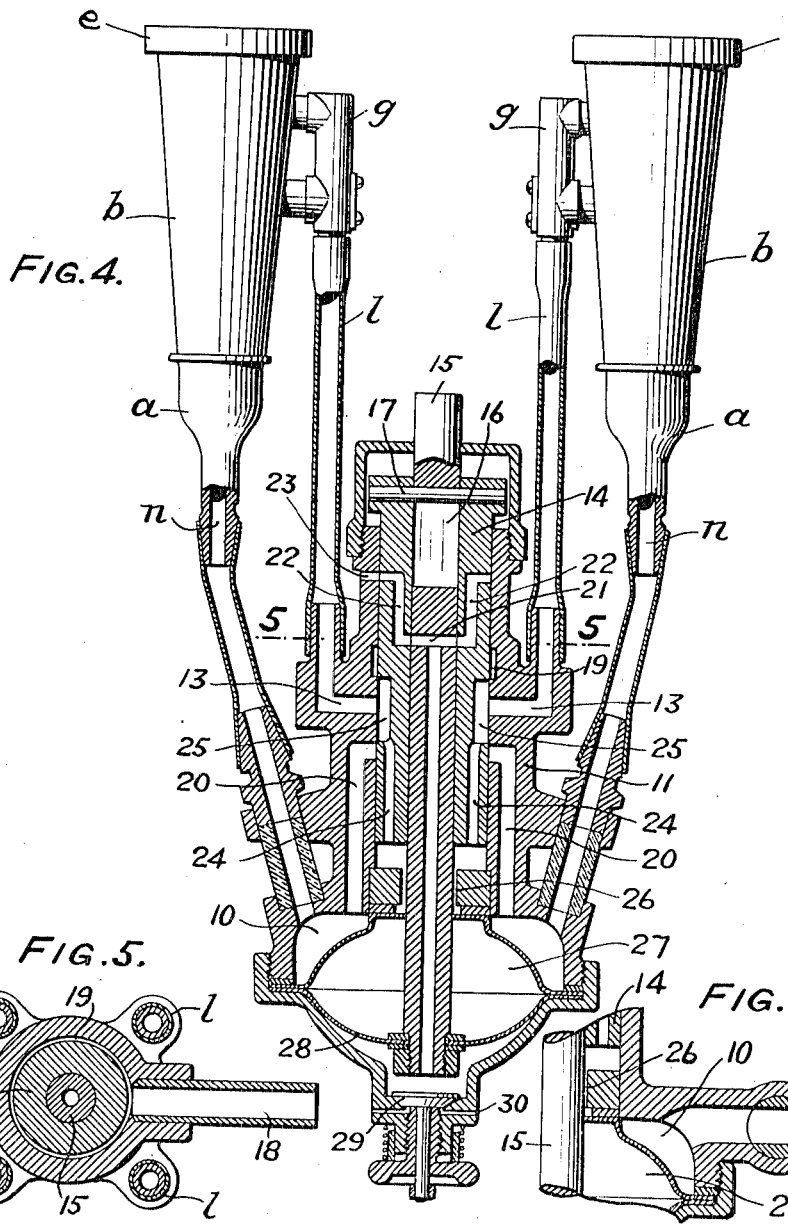

J. L. HULBERT.
TEAT CUP FOR MILKING MACHINES.
APPLICATION FILED JUNE 1, 1912.
1,089,838.
Patented Mar. 10, 1914.
3 SHEETS—SHEET 3.
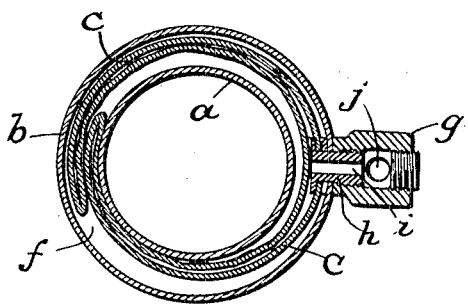
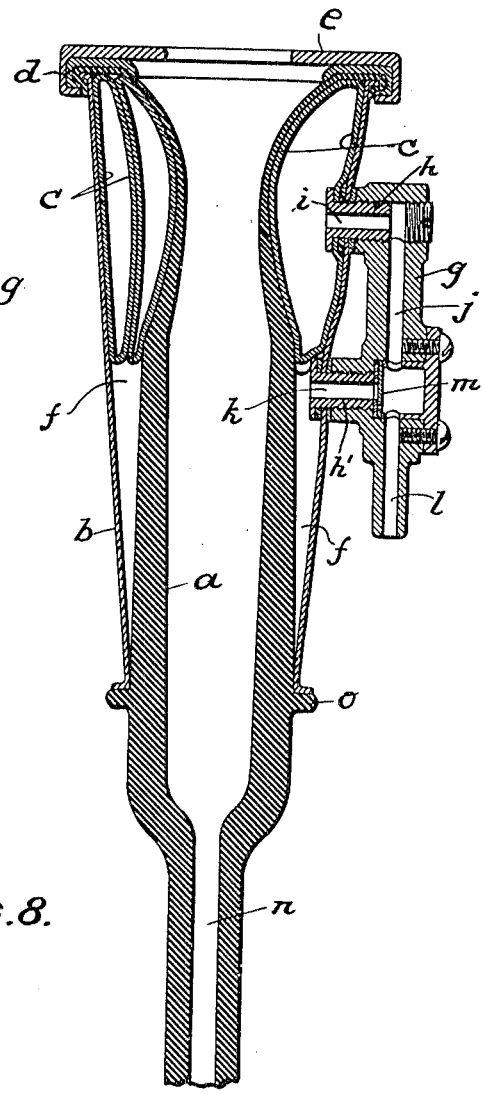
WITNESSES:
INVENTOR
John L. Hulbert
BY
Frank S. Busser
ATTORNEY.

UNITED STATES PATENT OFFICE.

JOHN L. HULBERT, OF POUGHKEEPSIE, NEW YORK, ASSIGNOR TO THE DE LAVAL SEPARATOR COMPANY, A CORPORATION OF NEW JERSEY.

TEAT-CUP FOR MILKING-MACHINES.

1,089,838.

Specification of Letters Patent.

Patented Mar. 10, 1914.

Application filed June 1, 1912. Serial No. 700,951.

*To all whom it may concern:*

Be it known that I, JOHN L. HULBERT, a citizen of the United States, residing at Poughkeepsie, county of Dutchess, and State of New York, have invented a new and useful Improvement in Teat-Cups for Milking-Machines, of which the following is a full, clear, and exact description, reference being had to the accompanying drawings, which form a part of this specification.

My invention relates to machines for extracting milk from cows and transferring it to a milk receptacle and particularly to teat cups for use in connection with such machines.

One of the objects of my invention is to support the teat throughout its entire length in such manner as to prevent expansion of the milk passage through the teat and also dilation and congestion of the end of the teat which would otherwise cause soreness.

Another object is to cause the cup to assume its proper position on the teat.

Another object is to provide for the automatic adjustment of one size of cup to a wide range of lengths, diameters and shapes of teats.

Another and more specific object of the invention is to provide a cup so constructed and so combined with a suitable pulsator that, simultaneously with the application of considerable pressure to the upper portion of the teat close to the udder, there is an application of a lesser pressure to the remainder of the teat, thereby effecting, or materially contributing to, the attainment of the first recited object of my invention.

The teat cup hereinafter described, which constitutes a preferred embodiment of my invention, is adapted to be connected with pulsators of a known type, and is more particularly adapted for connection with the pulsators set forth in certain patents heretofore issued to me, namely, Patent No. 1,070,134, dated August 12, 1913, Patent No. 1,070,135, dated August 12, 1913, and Patent No. 1,043,013, dated October 29, 1912, in which machines, the interior of the teat cup is constantly under and in communication with a source of suction and the inflatable cushion surrounding the teat is alternately connected with pressure and exhaust.

In the drawings: Figure 1 is a side elevation of my improved teat cup. Fig. 2 is a vertical sectional view of same showing the cushion deflated. Fig. 3 is a face view of the valve controlling one of the air passages in the fitting. Fig. 4 is a sectional view of a pulsator connected with two teat cups. Fig. 5 is a cross-section on line 5—5 of Fig. 4. Fig. 6 is a partial section showing outlet from milk chamber to milk receptacle. Fig. 7 is a section on the line 7—7 of Fig. 2. Fig. 8 is a vertical sectional view, similar to Fig. 2, with the cushion inflated.

In the teat cup embodying my invention, especially when operated as hereinafter described, the pressure around the lower portion of the teat, during compression of the base or upper portion thereof, is just sufficient to prevent the expansion of the lower portion of the teat.

My improved teat cup consists of a flexible cup proper $a$, a rigid outer shell $b$, a cushion $c$, a rigid cap $d$, a flexible mouthpiece $e$ and a fitting $g$, all arranged and connected as hereinafter described.

The cup proper $a$ is made of soft rubber or similar material and surrounds the entire teat. The upper part is made thin so as to be readily compressed around the teat. The lower part is given a greater thickness, thus making it stiff enough to be nearly self-supporting under ordinary conditions of operation. From the lower end, the extension $n$ forms a tube leading toward the milk receiving chamber 10 hereinafter described.

The rigid outer shell $b$ is, for considerations of lightness and cleanliness, preferably made of aluminum, though other materials may be used. The shell $b$ has a bottom flange against which the ring $o$ on the cup fits and an upper flange around which the thin upper end of the cup $a$ is drawn and then fastened by forcing on the cap $d$. The shell $b$ also has openings for the nipples $h$ and $h'$. It protects the rubber parts from injury, provides an exterior support for the cushion $c$, and forms the outer wall of the chamber $f$.

The cushion $c$ is made of rubber or similar material and may be in the form of a bag surrounding the cup $a$ and having the ends lapped or of such other form as may be found satisfactory. It is secured in place by means of the nipple $h$ hereinbefore mentioned.

The rigid cap $d$ is, like the shell $b$, and for the same reasons, preferably made of aluminum, and serves to hold the upper end of the cup a to the shell and to support it so that the pressure due to expansion of the cushion c cannot stretch it too far or tear it loose from the shell.

The mouthpiece e is made of rubber or similar flexible material and serves to seal the upper end of the cup around the teat and prevent the leakage of air at this point. It also prevents the contact of metal parts with the teat or udder. Such contacts have been found injurious in some cases.

The fitting g, like the shell b and cap d, and for the same reasons, is preferably made of aluminum. It comprises the nipples h and h' hereinbefore mentioned, both of which are screwed into the body g of the fitting and have respectively the passages i and k. These passages communicate at their outer ends with a vertical passage j—l formed in the body of the fitting and at their inner ends with the cushion c and chamber f respectively.

m is a flap-valve normally closing communication between passages k and l, adapted to open outward toward passage l to permit air to be exhausted from the chamber but adapted to close upon admission of pressure to passage l to prevent the return of air to the chamber.

In order that my invention may be understood without reference to my prior patents, I have illustrated in Figs. 4, 5 and 6 one of the pulsators shown in certain of said patents, it being understood that the details of such pulsator are not essential to the embodiment of the invention herein claimed. The pulsator comprises, in general, the milk receiving chamber 10 and the valve casing 11. 12 is the outlet from the milk receiving chamber leading to a milk receptacle (not shown). The pipe 12 is constantly under suction tending to produce a vacuum or partial vacuum in the milk receiving chamber 10, in the extension n, and in the interior of the teat cups. 13 is a passage in the valve casing 11, the same connecting with the pipe l. The valve comprises the valve proper 14 and the hollow valve stem 15. The valve stem has a slotted portion 16 through which extends a pin 17 connected with the valve proper 14. 18 is an inlet to the valve casing from any source of pressure supply. The inlet 18 terminates in an annular chamber 19 between the valve casing 11 and the valve proper 14. 20, 20, are passages in the valve casing leading upward from the milk receiving chamber 10 to the valve chamber. 21 is a passage or port through the wall of the valve stem 15 and communicating with the hollow portion of the stem. 22, 22, are passages in the valve proper communicating with the exhaust port 23. 24 and 25 are communicating passages in the valve proper. The valve stem 15 does not make a close fit in the lower part of the valve casing 11 but leaves a constricted annular passage 26. 27 is a diaphragm chamber having therein the diaphragm 28. In the lower portion of the diaphragm chamber is a puppet valve 29 controlling the atmospheric port 30.

When the valve 14 and valve stem 15 are in their lower positions, the diaphragm chamber 27 is, by passages 26, 24 and 20 in connection with the milk chamber 10, which, being under vacuum, relieves the pressure above the diaphragm 28, the puppet valve 29 lifts, and the air pressure below the diaphragm causes it to lift, lifting the hollow valve stem 15 with which it is connected. The stem 15 lifts until the slot and pin connection between it and the valve proper 14 causes the latter to lift also. This brings passages 25 and 24 in communication with the source of pressure supply and passage 25 in connection with the passages 13 connecting with the pipes l, into which air under pressure is thus admitted, with the resultant operation upon the teat cups hereinafter described. At the same time, through passages 25 and 24 air under pressure is admitted beneath the valve, causing it to quickly complete its movement to the top. Through the constricted passage 26 pressure is also slowly admitted to the diaphragm chamber above the diaphragm 28, which, with the valve stem 15, is forced down slowly, the movement being partly resisted by the compression of air below the diaphragm 28. During the downward movement of the valve stem 15 the upper end of the slot 16 strikes the pin 17 at the instant that the port 21 registers with the passage 22. It then carries with it the valve proper 14. When the passage 22 registers with the port 23 the compression in the space below the diaphragm 28 is relieved through the hollow stem 15, the port 21, the passage 22 and the port 23. A very slight further movement of the valve 14 covers the groove 19 and cuts off the supply of compressed air; but the expansion of the air in the space above the diaphragm 28 completes the movement of the diaphragm and, by the valve stem 15 and pin 17, carries the valve proper 14 to the position where groove 25 communicates with passage 20. The air from below the valve 14 escapes to the vacuum through passages 24 and 20, the milk chamber 10 and the passage 12. Atmospheric pressure, acting on the top of valve 14, completes the valve movement and connects the pipe l, through the passage 13, groove 25 and passage 20, with the milk chamber 10 and exhaust, with the resultant operation upon the teat cups hereinafter described. The valve is now in the original position and the cycle of operations is repeated.

To understand the operation of the teat cup, it may be assumed that the passage l is connected with the pulsator hereinbefore described, in which case the pipe *l* would be alternately connected with pressure and exhaust while the milk discharge from the tube *n* would be in constant communication with a source of suction but would receive pressure fluid once in each cycle of operations of the pulsator. It will be understood, therefore, that, after each teat is placed in a cup, the vacuum is turned on, and thereafter the tube *n* is always, during operation, in communication with the vacuum. At the time of adjustment, the passage *l* is also connected with the vacuum. As the inside of the cup *a* and the chamber *f* are both in communication with the vacuum, the pressures are balanced and the cup retains its natural shape, allowing the teat to be drawn down into the cup by the vacuum. The passage *l* is now disconnected from the vacuum and connected with a source of pressure. The valve *m* closes and prevents the pressure reaching the chamber *f* while the passages *j* and *i* are open and freely admit the pressure to the cushion *c*, filling it and causing the upper portion of the cup to collapse and compress the upper portion of the teat. The expansion of the cushion *c* drives all air remaining in the upper portion of the chamber *f* downward and so causes a pressure on the lower part of the teat. It will be clearly seen that this pressure, though much lower than that of the cushion *c*, will be higher than that inside of the cup *a*, which is in communication with the vacuum of greater intensity than at the time of exhaust of chamber *f*, as will be hereinafter explained. The heavy pressure around the upper portion of the teat drives the milk out of this portion. Because of the pressure on the lower portion of the teat, the milk passage cannot swell and the milk must pass out of the teat into the cup and from there through the tube *n* to the milk receptacle. The passage *l* is now disconnected from the source of pressure and is again connected with the source of vacuum and the tube *n*. The pressure immediately escapes from cushion *c* until it and also that in chamber *f* approximates the vacuum inside the cup *a*; but because of the hindrance to escape of air offered by the frictional resistance of the pipes leading to the milk pail and their obstruction by milk the vacuum is, at this time, less than that of the source of suction. Were it not for this condition the pressure in *f* during the compression part of the cycle might be too small to obtain the results desired. Even if, during the compression part of the cycle there should not be an absolute increase of pressure in the chamber *f*, still there is an increase in such pressure relatively to that within the cup, due to the conditions above explained. All flexible parts now assume their natural positions, the teat is again drawn into the cup *a* by the vacuum and the cycle is repeated. A point of great importance which should be here noted, is, that the same pressure which prevents the expansion of the milk passage through the teat also prevents the dilation and congestion of the end of the teat which would otherwise cause soreness.

The air escaping from cushion *c* performs several functions. 1st. The escape allows the collapse of the cushion and the expansion of the cup *a* ready for the movement of the teat as previously described. 2nd. Part of the air escapes directly to the milk pail through the pulsator and milk discharge pipe. 3rd. Because of a partial obstruction of the milk pipe, by milk, making a resistance to the instantaneous flow of the air to the milk pipe, a variable portion of the air passes through tube *n* to the cup *a* and produces pulsations in the vacuum at this point. It also makes a variation in the mean intensity of the vacuum in the cup. If the cow gives her milk freely, the obstruction in the pipe is great, and the air escapes to the pail slowly, causing a reduction in vacuum at the pulsator and cup. At the same time, because of the slow flow of air to the pail, a large proportion of the air goes to the cup, causing a great amplitude of pulsation. If the flow of milk is slight, the milk discharge pipe is comparatively unobstructed, and the air from the cushions flows to the pail almost instantaneously, and little or almost no air goes to the cup. This results in a higher mean vacuum at the pulsator and cup and also a lesser amplitude of pulsation in the vacuum. In fact, with heavy flows of milk the maximum vacuum at the cup is less than two-thirds that at the milk pail and the amplitude of pulsation is from about atmospheric pressure to the said maximum vacuum. With very slight flow of milk, as when stripping, the maximum vacuum is practically equal to that in the milk pail, while the amplitude of pulsation is often so slight as to be almost a continuous suction.

While I have hereinbefore spoken of a "vacuum", I adopt that term for purposes of convenience, and mean thereby to cover any degree of pressure less than that of the atmosphere. While I have also spoken of increasing the pressure upon the outside of that part of the cup adapted to surround the lower portion of the teat during the application of pressure to the base of the teat, I do not mean to limit myself to an actual increase of the pressure within the space around the lower part of the cup, but mean to include any condition, including an absolute diminution of such pressure, provided such pressure increases relatively to the pressure within the cup.

From the foregoing description of the operation of my improved teat cup, it will be understood that it is especially adapted for use in connection with the pulsator described in my applications for patent hereinbefore enumerated and to more effectively carry out the process set forth in Patent No. 1,043,013. I do not, however, confine myself to the use of any particular type of pulsator in connection with my improved teat cup, as the same may be found to be capable of use in connection with pulsators of a different type. It is also possible to use my improved teat cup, or certain novel combinations of features embodied therein, in such a way as that it shall have a mode of operation somewhat different from that described.

Among the minor, but important, features of my improved teat cup is the manner in which the flexible cup $a$ fits against the lower end of the rigid shell $b$. If, for any reason, such as the failure of valve $m$ to close properly, or leakage from cushion $c$, the pressure in the chamber $f$ becomes greater than atmospheric, the ring $o$ will be forced away from the shell and allow the excess pressure to escape, thus preventing injury to the cup or discomfort to the cow.

I do not herein claim the process of mechanically milking hereinbefore described that may be carried out by the use of the herein described construction, as such process forms the subject-matter of an application filed by me March 29, 1913, Serial No. 757,576.

Having now fully described my invention, what I claim and desire to protect by Letters Patent is:—

1. In a milking machine, a teat cup comprising a flexible cup adapted to surround and support substantially the whole teat, and means to intermittently apply, a pressure upon the outside of that part of the cup adapted to surround the base of the teat, and in unison therewith, a lesser pressure upon the outside of that part of the cup adapted to surround the remainder of the teat, thereby maintaining a supporting pressure upon the lower portion of the teat throughout the squeezing pressure upon the base of the teat.

2. In a milking machine, a teat cup comprising a flexible cup adapted to surround and support substantially the whole teat, and means intermittently and simultaneously to apply a pressure upon the outside of that part of the cup adapted to surround the base of the teat and to diminish the pressure within the cup.

3. In a milking machine, a teat cup comprising a flexible cup adapted to surround and support substantially the whole teat, and means to successively apply, maintain and remove pressure upon the outside of that part of the cup adapted to surround the base of the teat and respectively simultaneously therewith apply, maintain and remove pressure of a lesser degree upon that part of the cup adapted to surround the remainder of the teat.

4. In a milking machine, a teat cup comprising a flexible cup adapted to surround and support substantially the whole of the teat, and means to intermittently increase the pressure upon the outside of that part of the cup adapted to surround the base of the teat and, during only said increase, to increase the pressure to a lesser degree upon the outside of that part of the cup adapted to surround the remainder of the teat.

5. In a milking machine, a teat cup comprising a flexible cup adapted to surround and support substantially the whole teat, an inflatable and deflatable cushion surrounding the upper portion of said flexible cup, and means simultaneously to inflate the cushion and to diminish the pressure within the cup relatively to the pressure outside the cup below the cushion.

6. In a milking machine, a teat cup comprising a flexible cup adapted to surround and support substantially the whole of the teat, and means to intermittently increase the pressure upon the outside of that part of the cup adapted to surround the base of the teat and during only said increase to increase to a lesser degree the pressure upon the outside, relative to that on the inside, of the portion of the cup adapted to surround the remainder of the teat, and alternately therewith to deflate the cushion and simultaneously therewith increase the pressure within the cup.

7. In a milking machine, a teat cup comprising a flexible cup adapted to surround and support substantially the whole teat, an inflatable and deflatable cushion surrounding the upper portion of the flexible cup, a shell surrounding the flexible cup and inclosing the cushion, and means simultaneously to inflate the cushion and to diminish the pressure within the cup relatively to the pressure between the cup and shell.

8. In a milking machine, a teat cup comprising a flexible cup adapted to surround and support substantially the whole teat, and means to establish a partial vacuum within the cup and intermittently to apply a pressure upon the outside of that part of the cup adapted to surround the base of the teat and simultaneously therewith to increase the degree of vacuum within the cup.

9. A teat cup for milking machines comprising a flexible cup having a relatively wide upper portion adapted to surround the teat and tapered toward its lower end, and a cushion surrounding the upper portion of the cup.

10. A teat cup for milking machines comprising a flexible cup adapted to surround and support substantially the whole teat and tapered from its upper portion toward its lower end, an inflatable and deflatable cushion surrounding the upper portion of said flexible cup, and a shell surrounding said flexible cup and inclosing the cushion.

11. A teat cup for milking machines, comprising an inflatable cushion adapted to surround the base of the teat, and a cup comprising a relatively short upper portion surrounded by the cushion and having a relatively thin and flexible wall and a relatively long lower portion extending below the cushion and having a relatively thick and stiff wall.

12. In a milking machine, a teat cup comprising an outer shell, an inner flexible cup, a cushion between the shell and cup near that part of the same adapted to surround the base of the teat, and means to intermittently inflate the cushion, whereby the pressure between the shell and cup will be increased during inflation of the cushion and thereby create a limited pressure upon that part of the cup beyond the cushion.

13. In a milking machine, a teat cup comprising an outer shell, an inner flexible cup, a cushion between the shell and cup near that part of the same adapted to surround the base of the teat, means to maintain a low pressure between the shell and cup, and means to intermittently inflate the cushion, thereby intermittently compressing the air between the cup and shell.

14. In a teat cup for milking machines, a flexible cup adapted to surround and support substantially the whole teat, a shell surrounding the cup, a hollow cushion within the shell and surrounding the upper portion of said flexible cup, and means affording a passage connected with the interior of the cushion and extending through the shell, whereby when the passage is connected with supply or exhaust and the cushion thereby inflated or deflated, the pressure in the chamber between the shell and cup will increase or decrease due to the resultant decrease or increase in the volume of said chamber.

15. In a milking machine, a teat cup comprising a hollow cushion adapted to surround the base of the teat and a flexible cup adapted to surround the remainder of the teat, and means permitting the simultaneous deflation of the cushion and reduction of pressure outside said cup, and alternately therewith, the simultaneous inflation of the cushion and increase of pressure outside said cup.

16. In a milking machine, a teat cup comprising a flexible cup surrounding the entire length of the teat and a hollow cushion adapted to suround said flexible cup at that portion which incloses the base of the teat, and means permitting the simultaneous deflation of the cushion and reduction of pressure outside said cup, and alternately therewith, the simultaneous inflation of the cushion and increase of pressure outside said cup.

17. In a milking machine, a teat cup comprising a flexible cup adapted to surround and support substantially the whole teat, that part of the cup adapted to surround the portion of the teat at the base possessing a relatively high degree of flexibility so as to be readily compressed around the teat and that portion of the cup adapted to surround the portion of the teat below the base adapted to collapse by differential pressure applied to the inside and outside of said portion of cup to a degree sufficient to prevent dilation of the teat and not to shut off the flow of milk, and means including a dilatable hollow cushion surrounding the upper portion only of the cup, adapted to compress the part of the cup adapted to surround the base of the teat and cause the establishment of said differential pressure.

18. In a milking machine, in combination, a flexible cup adapted to surround and support substantially the whole teat, and means, including an inflatable cushion surrounding that portion of the cup at the base of the teat, for producing such difference in pressure between the inside and the outside of the cup that said cup will be compressed around the teat sufficiently to prevent dilation of the teat or expansion of the milk passage through same and yet not enough to stop the flow of milk.

19. In a milking machine, in combination, a flexible cup adapted to surround and support substantially the whole teat, an inflatable cushion surrounding that portion of the cup at the base of the teat, means to alternately inflate and deflate the cushion, means permitting, simultaneously with the deflation of the cushion, a balance low pressure inside and outside the cup, thereby allowing the teat to be drawn down into the cup, and permitting, simultaneously with the inflation of the cushion, an excess of pressure outside the cup over that inside the cup, sufficient to compress the teat to a degree preventing its dilation or expansion of the milk passage but not sufficient to stop the flow of milk.

20. In a milking machine, in combination, a flexible cup adapted to surround and support substantially the whole teat, an inflatable cushion surrounding that portion of the cup at the base of the teat, means to alternately inflate and deflate the cushion, means permitting, simultaneously with the deflation of the cushion, a balance low pressure inside and outside the cup, thereby allowing the teat to be drawn down into the cup, and permitting, simultaneously with the inflation of the cushion, a pressure outside the flexible cup higher than that within the cup but lower than that in the inflated cushion.

21. A teat cup for milking machines comprising a flexible cup adapted to surround and support substantially the whole teat, a shell surrounding the cup, a cushion within the shell and surrounding the upper portion of said flexible cup, and a fitting outside the shell, said fitting comprising nipples connected respectively with the interiors of the cushion and shell and containing a passage communicating with both nipples and comprising also a check-valve between said passage and the nipple communicating with the interior of the shell.

22. In a milking machine, in combination, a rigid shell, a flexible cup therein adapted to surround and support substantially the whole teat, an inflatable cushion surrounding that portion of the cup at the base of the teat, means to alternately inflate and deflate the cushion, means permitting, simultaneously with the deflation of the cushion, a balance low pressure inside and outside the cup, thereby allowing the teat to be drawn down into the cup, and permitting, in the space between the rigid shell and the flexible cup, simultaneously with the inflation of the cushion, a pressure higher than that within the cup but lower than that in the inflated cushion.

In testimony of which invention, I have hereunto set my hand, at New York, on this 29th day of May, 1912.

JOHN L. HULBERT.

Witnesses:
   Roy H. Stoddard,
   Robert H. Keep.